Figure 1:
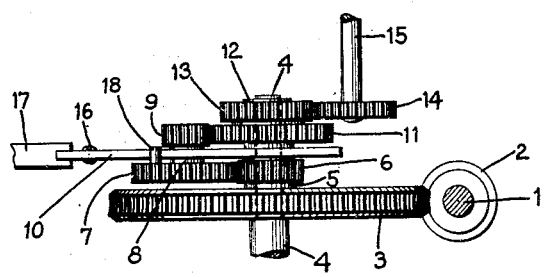

Aug. 30, 1932.    H. L. TANNER    1,874,652

INDICATION CONTROLLING APPARATUS

Original Filed April 20, 1929

Inventor
Harry L. Tanner
By his Attorneys
Cooper, Kerr & Dunham

Patented Aug. 30, 1932

1,874,652

UNITED STATES PATENT OFFICE

HARRY L. TANNER, OF BROOKLYN, NEW YORK; THE NATIONAL CITY BANK OF NEW YORK, EXECUTOR OF SAID HARRY L. TANNER, DECEASED, ASSIGNOR, BY MESNE ASSIGNMENTS, TO WALLACE & TIERNAN PRODUCTS, INC., OF BELLEVILLE, NEW JERSEY, A CORPORATION OF NEW JERSEY

INDICATION CONTROLLING APPARATUS

Application filed April 20, 1929, Serial No. 356,635. Renewed January 5, 1932.

This invention relates to indicating systems and has for its purpose, among other objects and advantages which will become apparent to those skilled in the art as they read the following disclosure, to provide a system of connections whereby an indicator is driven at different ratios by and with respect to an indication-controlling member, depending upon the extent of travel or position of the latter.

The invention may be best explained by considering its application in and to a specific arrangement for which it has been designed; it being understood of course that it may be adapted to other uses with only such changes as will occur to those skilled in the art.

Suppose it is desired to indicate the position of a movable object (such as penstock gate or float) having a range of vertical movement of 214 feet, in such manner that the movement thereof over the lower 14 feet causes corresponding movement of the pointer of an indicator over one-half of its scale and movement of the object over the upper 200 feet causes corresponding movement of the same pointer over the other half of its scale, and that the indication shall be automatic. The means illustrated may be employed for this purpose, as well as for others.

Figure 2:
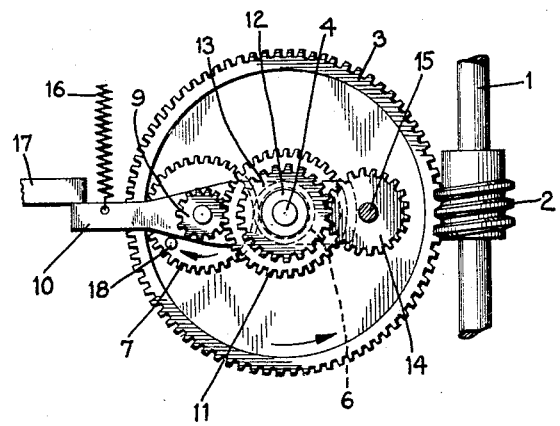

Referring to the drawing, which illustrates what I now consider a preferred form of the invention:

Fig. 1 is a fragmentary side elevation of mechanism embodying the invention, and Fig. 2 is a plan view of the structure shown in Fig. 1.

The shaft 1, which I shall call the "indication-controlling member" is adapted to be driven in any suitable way by the device, say a penstock gate (not shown), whose position is to be indicated. The shaft 1, and each of the shafts 4 and 15 hereafter referred to, is journaled for rotation about its axis but constrained against any other movement by suitable bearings (not shown). The shaft 1 has secured thereto a worm 2 which meshes with a worm wheel 3 loose upon the shaft or spindle 4 but secured to a hub or sleeve 5 to which a gear 6 is also secured. The gear 6 meshes with a gear 7 secured to a hub or sleeve 8 to which a gear 9 is also secured. The sleeve 8 is journaled for rotation about its axis in a plate or bracket 10 through which the spindle 4 passes. At certain times the plate 10 turns or swings on the spindle 4 about the axis of the latter. The gear 9 meshes with a gear 11 secured to a hub or sleeve 12 which is rotatable on the spindle 4. A gear 13 also secured to the sleeve 12 meshes with a gear 14 secured to the shaft 15. The shaft 15, which I shall refer to as a member adapted to control an indicator, may be connected mechanically, electrically, pneumatically, or otherwise, to a suitable indicating instrument (not shown) calibrated to indicate the position of the penstock gate or other movable object. For example, the shaft 15 may be the shaft 26 of the rotor 25 of the transmitter shown in Fig. 2 of my copending United States application Serial No. 280,729 which controls the indicator there illustrated and described.

When the gears 7 and 9 are free to rotate about their axis but constrained against revolution about the axis of the spindle 4, the shaft or indication-controlling member 1 drives the shaft 15 (which is the member adapted to control the indicator) as follows: the shaft 1 rotates the worm 2, the worm 2 rotates the worm wheel 3, the worm wheel 3 rotates the sleeve 5 and the gear 6, the gear 6 rotates the gear 7, the gear 7 rotates the sleeve 8 and the gear 9, the gear 9 rotates the gear 11, the gear 11 rotates the sleeve 12 and the gear 13, and the gear 13 rotates the gear 14 and the shaft 15.

When these means are effective to drive as described the gear 13 is driven at a different rate—slower in the case illustrated—than the gear 3. Means are provided for causing the gear 13 to travel at a one-to-one ratio with the gear 3. I shall now proceed to describe these means.

When the gears 7 and 9 are prevented from rotating about their axis but are free to revolve about the axis of the spindle 4, the system of gears 3—5—7—9—11—13 is locked and rotates as a unit about the axis of the spindle 4. The drive is now as though the gears 3 and 13 were secured to each other to rotate together. The shaft 15 is thus now rotated by the shaft 1 at a different drive ratio from that above described.

Means are provided for automatically locking the gears 7 and 9 against rotation about their axis and permitting them to be revolved about the axis of the spindle 4; these means being controlled by the extent of travel or movement of the indication-controlling member 1. The means illustrated for achieving this result comprise the plate or bracket 10, a fixed (stationary) stop 17 against which the bracket 10 is adapted to abut, a tension spring 16 anchored at one end to a stationary support and secured at its other end to the bracket 10 so as to tend to hold the latter against its stop 17, and a pin 18 secured to the gear 7 and adapted to engage the bracket 10.

The design and connections are such that the operation, in the specific case assumed, is as follows. Assume that the penstock gate is at the top of its 214 feet of vertical travel and is moving or being moved downwardly. The shaft 1 is being driven by the penstock gate, the pin 18 is not in contact with the bracket 10, the gear 3 is being rotated in the direction of the arrow shown thereon (Fig. 2), and the gears 7 and 9 are not locked against rotation. The shaft 15 is now being driven at a comparatively slow rate by the shaft 1 through the gear train 3—6—7—9—11—13—14 in the manner first described. The pointer of the indicator (not shown) is moving over the upper half of its scale and is indicating the position of the penstock gate with a comparatively coarse reading because this half of the indicator scale represents 200 feet. When the penstock gate reaches a position 200 feet below its uppermost position (14 feet above its bottom position) and is still lowering or being lowered, the pin 18 engages the bracket 10, the gears 3—6—7—9—11—13 are locked and rotate with the bracket 10 as a single unit about the axis of the spindle 4; and the spring 16 permitting such movement of the bracket 10 away from the stop 17. The shaft 15 is now being driven at a comparatively rapid rate by the shaft 1, and the pointer of the indicator (not shown) is moving over the lower half of its scale and is indicating the position of the penstock gate with a comparatively fine reading because this half of the indicator scale represents only 14 feet. When the penstock gate reaches its lowest position and reverses, i. e. starts to move upwardly, the gear 3 is rotated in the opposite direction (i. e. opposite to the direction indicated by the arrow thereon in Fig. 2) and the spring 16 pulls the bracket 10 towards the stop 17 under the controlling movement of the gear 3. During this movement the gears 3, 6, 7, 9, 11, 13, and the bracket 10 are all moving as a unit about the axis of the spindle 4. When the penstock gate, still travelling upwardly, reaches a position 14 feet from the bottom, the bracket 10 reengages the stop 17 and the parts are in such position that the pin 18 is now free to rotate away from the bracket 10. Continued upward movement of the penstock gate now causes the shaft 1 to drive the shaft 15 in the manner first described but in the reverse direction.

As explained above, when the gear 7 is locked with respect to the bracket 10 by the engagement of the pin 18 against the bracket 10, the drive is as though the gears 3 and 13 were secured to each other. The drive ratio when the pin 18 is free to rotate away from the bracket 10 may be made as much greater or less than that when the gears 3 and 13 are in effect locked to each other, as desired, by suitably selecting and designing the gears 6—7—9—11. The stop 17 may be located on the other side of the bracket 10 (Fig. 2) if desired, in which event the spring 16 would also be located on the other side.

By the means above described, or equivalent means, one part (say one-half) of the scale of an indicating instrument may be employed to indicate travel of the shaft 1 (or of an object that drives the shaft 1) at a predetermined ratio, and the other part of the scale (say the other half) may be employed to indicate travel of the shaft 1 at a different ratio with respect to that of the first part of the scale.

In accordance with the provisions of the patent statutes, I have herein described the principle of operation of my invention, together with the apparatus which I now consider to represent the best embodiments thereof, but I desire to have it understood that the apparatus disclosed is only illustrative and that the invention can be carried out by other means. Also, while it is designed to use the various features and elements in the combinations and relations described, some of these may be altered and others omitted and some of the features of each modification may be embodied in the others without interfering with the more general results outlined, and the invention extends to such use.

What I claim is:

1. In combination, an indication-controlling member adapted to be actuated in accordance with an object whose position is to be indicated, a member at all times operatively connected to said first mentioned member adapted to control an indicator, means connecting said members whereby the former during a predetermined range of its movement actuates the latter at a predetermined relative constant rate, means connecting said members whereby the first mentioned member during a different range of its movement actuates the second mentioned member at a predetermined different relative constant rate, means for automatically causing the change in ratio of the constant rates of said members to occur at a predetermined instant of movement of the first mentioned member, and means controlled by the extent of movement of said first mentioned member for automatically selectively controlling said two first mentioned means.

2. A transmitting system for telemetric systems, comprising in combination, a train of gears adapted to control an indicator by an object whose position is to be indicated, said train including a plurality of gears mounted for rotation about their own axis and for revolution about a spaced axis constituting the axis of rotation of certain others of the gears of the train, and means controlled by the extent of movement of one of said gears for controlling the rotation and revolution of the said plurality of gears which are mounted for rotation and revolution.

3. A transmitting system for telemetric systems comprising in combination, a gear, a second gear, a train of gears connecting said first and second mentioned gears whereby the first gear drives the second gear at a different rate, and means automatically controlled by the extent of movement of said first mentioned gear for locking said gear train whereby said first mentioned gear drives said second mentioned gear at a one-to-one rate.

4. A transmitting system for telemetric systems comprising in combination, a pair of gears mounted for rotation about a common axis, gearing interposed between said pair of gears for causing one to rotate the other at a different rate, and means automatically controlled by the extent of movement of one of said pair of gears for causing said gears and gearing to turn as a unit about the common axis of the first mentioned gears whereby one of the first mentioned gears drives the other at a one-to-one ratio.

5. In an indicating system, in combination, a pivotally mounted bracket, a driven gear and a driving gear having their axis of rotation common with the pivotal center of said bracket, gearing connecting said driven and driving gears comprising a pair of gears mounted on said bracket and joined to rotate together on an axis spaced from the pivotal axis of the bracket, and a pin carried by a gear of said gearing and adapted to contact with said bracket to limit rotation of the gear about its own axis and cause the bracket to pivot.

6. In an indicating system, in combination, a pivotally mounted bracket, a driven gear and a driving gear, a train of gearing intermediate said driven gear and driving gear, said train of mechanism comprising a gear mounted upon said bracket and having an axis of rotation displaced from the pivotal axis of said bracket, a fixed stop adapted to be engaged by said bracket, means for maintaining said bracket engaged with said stop during a portion of the angular travel of said driving gear, and means for stopping rotation about its axis of the gear mounted upon the bracket at the completion of the said portion of the angular travel of said driving gear, whereby when the said rotation of said last named gear is stopped, the driven gear and the bracket are caused to rotate in the same direction and at the same rate as the driving gear.

7. An indicating system comprising in combination, a controlling shaft, a controlled shaft, change-speed gearing interposed between said shafts and constituting a continuous drive connection between them whereby movement of one of the shafts is always accompanied by movement of the other, said change-speed gearing including means for driving one of said shafts by the other at a predetermined constant ratio and means for driving the said one of said shafts by the other at a different predetermined constant ratio; and means responsive to the extent of travel of said controlling shaft for changing the gear ratio of said change-speed gearing from one to another of said constant ratios at a predetermined point of travel of said controlling shaft.

In testimony whereof I hereto affix my signature.

HARRY L. TANNER.